United States Patent [19]

Brown

[11] Patent Number: 4,961,888
[45] Date of Patent: Oct. 9, 1990

[54] LIQUID SILICONE MOLDING PROCESS

[75] Inventor: Paul E. Brown, Midland, Mich.

[73] Assignee: Liquid Molding Systems, Inc., Midland, Mich.

[21] Appl. No.: 225,486

[22] Filed: Jul. 28, 1988

[51] Int. Cl.⁵ .................. B28B 5/02; B28B 13/02; B28B 13/04

[52] U.S. Cl. .................. 264/40.6; 198/570; 264/40.7; 264/297.3; 264/297.5; 264/297.7; 264/297.8; 425/34.1; 425/261; 425/453; 425/575; 425/DIG. 108; 425/DIG. 201

[58] Field of Search ............ 34/25, 52, 205; 198/570; 264/40.6, 57, 297.2, 297.3, 297.6, 297.7, 236, 347, 297.4, 297.5, 40.7, 297.8; 425/34.1, 34.3, 186, 190, 451, 453, 575, 588, 434, 435, 261, 576, 452, 4 R, DIG. 201, 445, DIG. 108

[56] References Cited

U.S. PATENT DOCUMENTS

| | | | |
|---|---|---|---|
| 1,502,692 | 7/1924 | Sterrett | 34/205 |
| 1,540,219 | 6/1925 | Myers | 425/34.3 |
| 1,873,239 | 8/1932 | Woodson | 432/243 |
| 2,261,149 | 11/1941 | Enerson | 4/207 |
| 2,342,189 | 2/1944 | Gladfelter et al. | 198/20 |
| 2,355,814 | 8/1944 | Mayer | 4/207 |
| 3,801,255 | 4/1974 | Meyer et al. | 425/453 |
| 3,924,995 | 12/1975 | Crooks et al. | 425/129.2 |
| 3,992,182 | 11/1976 | Frank | 65/163 |
| 4,132,518 | 1/1979 | Rips | 425/445 |
| 4,402,661 | 9/1983 | Laghi | 425/543 |
| 4,434,127 | 2/1984 | Baile | 264/236 |
| 4,474,724 | 10/1984 | Laghi | 264/328.2 |
| 4,551,293 | 11/1985 | Diehl, Jr. et al. | 264/236 |
| 4,552,713 | 11/1985 | Cavicchioli | 264/347 |

Primary Examiner—Jeffery Thurlow
Assistant Examiner—Mathieu Vargot
Attorney, Agent, or Firm—Price, Heneveld, Cooper, DeWitt & Litton

[57] ABSTRACT

A process for molding thermosetting plastic parts in a more efficient manner involving less cost and a higher production output, includes sequentially filling molds with a thermosetting plastic material in a continuous and uniform manner, passing the molds sequentially through an elongated heating chamber, removing the parts from the molds, and returning the molds for reuse. Also, to increase the versatility of the process, a plurality of independently driven conveyor assemblies are positioned within the heating chamber so that a number of different parts having different sizes, configurations and/or material may be fabricated concurrently with one another.

8 Claims, 1 Drawing Sheet

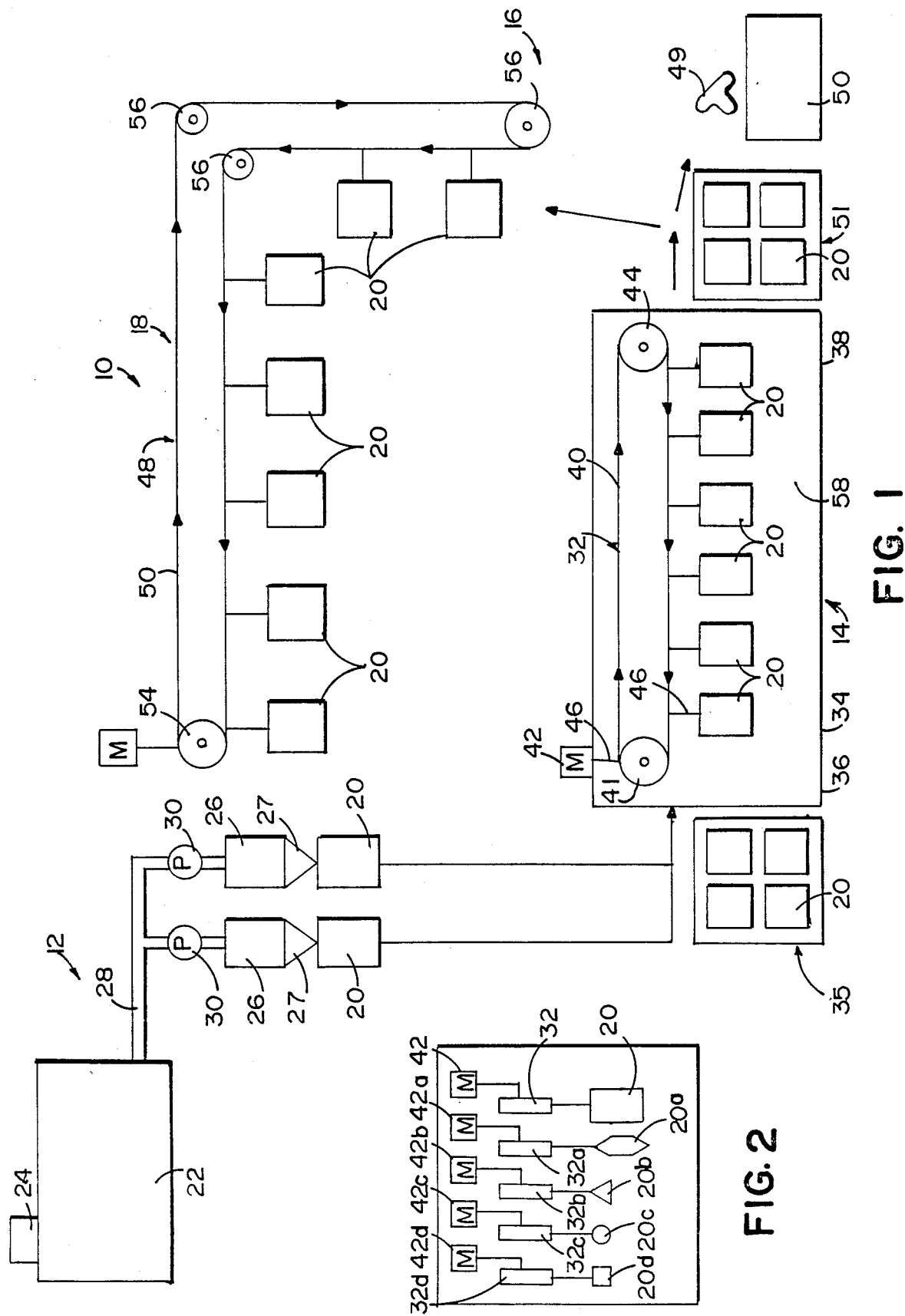

LIQUID SILICONE MOLDING PROCESS

BACKGROUND OF THE INVENTION

The present invention pertains to molding processes, and in particular to a process for heat curing plastic parts, and the like.

The molding of thermosetting plastic parts is typically performed by an injection molding machine which pressure feeds the plastic material into a die, heats the material to a prescribed temperature for a certain time period, and then, ejects the cured product for collection and packaging. However, such machines are very costly to purchase and maintain. Moreover, the output production in this environment is relatively low, since the machine of necessity must wait for the required curing time and for the ejection of the part before injecting new material into the die.

Processes involving continuous oven arrangements have been utilized in the paint curing, pottery drying and like industries. Examples of such arrangements are disclosed in: U.S. Pat. No. 1,873,239 to Woodson, and entitled CONVEYOR FURNACE; and U.S. Pat. 2,261,149 to Emerson, and entitled TRAVELING CONVEYOR SYSTEM. However, these machines and processes are devoid of the handling and curing concerns involving a plastic molding operation. Furthermore, these systems lack versatility in that each oven is capable of handling only one operation at a time.

SUMMARY OF THE INVENTION

In the present invention, molding of thermosetting plastic parts is effected through a unique process which not only reduces costs and increases output, but also greatly enhances the production versatility.

The process involves continuously filling consecutive molds with a thermosetting plastic material, and then conveying the molds sequentially through a heating chamber for curing. At the end of the heating chamber, the finished product is removed from the mold and the mold is returned to the filling station for reuse.

In a second aspect of the invention, several independent conveyors are positioned within the one heating chamber. The conveyors are adapted to travel at speeds independent of one another, to thereby facilitate the simultaneous curing of different parts in the same heating chamber; that is, the curing times may be set for each individual part by adjusting the speed of the conveyor transporting the part through the heating chamber.

By using the process of the present invention, the waiting between injections heretofore required for the curing of the plastic material is essentially eliminated. Hence, the production capabilities are greatly increased. Moreover, the present process eliminates the need for costly and complex equipment, such as injection molding machines; thus resulting in a great economic savings to the operator. Furthermore, many different parts may be simultaneously molded and cured with the provision of only one heating chamber which not only again increases the production output, but also the versatility of the operation.

These and other objects, advantages and features of the present invention will be more fully understood and appreciated by reference to the written specification and appended drawings.

BRIEF DESCRIPTION OF THE DRAWINGS

FIG. 1 is a schematic view of the process of the present invention; and

FIG. 2 is a schematic end view of the heating chamber of the present invention.

DETAILED DESCRIPTION OF THE PREFERRED EMBODIMENTS

In the preferred embodiment, the process of molding thermosetting plastic material is accomplished through a system 10 including a loading station 12, a heating station 14 and an unloading station 16 having a return cycle 18. The system 10 involves a continuous system without delays or inherent waiting periods in the molding process.

At the loading station 12, the individual molds 20 are filled with a thermosetting plastic material, such as a liquid silicone. In operation, a plurality of identical molds 20 are provided for each part to be molded to facilitate sequential filling thereof. A wide variety of parts, such as baby bottle nipples, breast pumps, etc., may be fabricated by this system.

Loading or filling station 12 includes a reservoir 22 of liquid silicone under pressure. The pressure may be provided through a conventional pneumatic pump 24 or other known means. Reservoir 22 is fluidly coupled with a plurality of shot cylinders 26 via conduits 28. The shot cylinders 26 are fabricated to have a volume substantially equal to the volume needed to mold each individual part. Interspersed in conduits 28 to precede each shot cylinder 26 is a metering pump 30 which monitors the loading of each shot cylinder 26 to ensure proper filling. Once filled, the shot cylinders 26 are utilized to transfer the plastic material out nozzle 27 and into the desired mold 20. This transfer is achieved either through the flow of gravity or under pressure, depending upon the specific plastic material used.

After the mold is filled, the operator conveys the mold from the loading station 12 to the heating station 14. More particularly, the operator moves the mold from the shot cylinders 26 and couples it to a conveyor 32 designed to convey the molds sequentially through a heating chamber 34 which maintains a substantially constant temperature across its length. The movement of the molds from the shot cylinders 26 to the heating chamber 34 may be accomplished manually or by known semi-automatic or automatic means.

Alternatively, the system may be operated as a batch system to reduce the needed man power or capital investment in automatic mechanisms. More specifically, a large number of molds may be filled and placed at a first waiting station 35 near the heating chamber 34. The operator may thereafter, at any time, load the filled cylinders sequentially into heating chamber 34 for curing.

The heating chamber 34 is preferably an elongated, rectangular hollow structure having an open front end 36 wherein the molds 20 are received and an open rear end 38 wherein the molds exit. Also, in the most preferred embodiment, conveyor 32 includes an endless chain 40 adapted for continuous motion about a driving sprocket 41 driven by a motor 42 and an opposite idler sprocket 44. The molds 20 are, then, loaded sequentially onto chain 40 by a conventional hook means 46. Nevertheless, the molds 20 may of course be conveyed through the heating chamber 34 by a wide variety of different conveyors.

The rate at which chain 40 is moved is determined by the specific part being molded. More specifically, each individual part— due to its size, configuration and material— will have a specific curing time at a particular temperature. Hence, chain 40 is driven at a particular speed such that the time it takes each mold 20 to traverse the length of heating chamber 34 will substantially equal the predetermined curing time for the part contained therein.

Once the molds 20 reach the rear end 38 of heating chamber 34, they are unloaded from chain 40, via manual or known semi-automatic or automatic means, at unloading station 16. At unloading station 16, the parts are ejected from mold 20, preferably by opening a two-part mold, and the molds are mounted upon a return conveyor 48. The cured plastic parts 49 are passed to a collection station 50 for packaging or further treating operations. This operation may either be operated as a continuous system or a batch system (wherein the molds may again be placed at a second waiting station 51) depending upon the specific needs of the operator.

Return conveyor 48 acts to return the molds 20 to the loading station 12 so that they may be refilled by a shot cylinder 26 for subsequent reuse. The return conveyor 48 is preferably comprised of an endless chain 52 driven by a driving sprocket 54 and idler sprockets 56. However, return conveyor 48 may of course be of any known means possessing the requisite characteristics. The recycling of the molds 20 occurs in the continuous system with sufficient speed so that the molds have not entirely cooled off when they are refilled. This feature enables a quicker curing time and, in turn, a higher production output of parts. As an example only, in an embodiment wherein the heating chamber 34 heats the molds to a temperature of about 340° F., the molds 20 will have cooled to only approximately 270° F. when they are refilled by shot cylinders 26.

During the initial start-up of the process, the molds 20 passing through heating chamber 34 will have a cooler initial starting temperature, since they would not have previously been run through the heating chamber. In these instances, conveyor 32 is run at a slower speed so that additional time is provided for ample curing of the part. Alternatively, the molds 20 may first be run through heating chamber 34 empty so the speed of conveyor 32 need not be changed once the process has begun.

The continuous operation, then, includes initially the sequential filling of molds 20 with a plastic material from shot cylinders 26 in a continuous and uniform manner, and without the inherent delays experienced in the prior art. The molds 20 are then sequentially loaded onto conveyor 32 and continuously moved through heating chamber 34 to facilitate curing of the plastic part. Once the molds 20 have been passed through the heating chamber 34, the plastic parts are ejected therefrom and the molds are coupled to a return conveyor wherein they are returned to the shot cylinders for refilling and reuse.

To further increase the productivity and versatility of the present molding system, a number of conveyors 32, 32a, 32b, 32c and 32d are positioned within the cavity 58 of heating chamber 34. The conveyors 32, 32a, 32b, 32c, 32d are arranged in a substantially parallel relationship with one another and are each provided with an independent driving means 42, 42a, 42b, 42c, 42d. For example, each driving means 42, 42a, 42b, 42c, 42d may include a motor operably attached to a driving sprocket for the chain conveying the molds through heating chamber 34.

This feature permits a number of different parts having different sizes, configurations and/or material to be fabricated concurrently with one another. More specifically, a plurality of sets of molds 20, 20a, 20b, 20c, 20d may be used. The molds of each set are for molding a part having a particular size, configuration and material. Further, the parts molded in each set of molds differs in either the size, configuration and/or material from the parts molded in the other sets of molds. Each set of molds 20, 20a, 20b, 20c, 20d, then, follows the same process as described above for the one set of molds 20.

Moreover, all of the sets may be cured within the one cavity 58 of the single heating chamber 34. Since each different part will have a different curing time at the particular temperature of heating chamber 34, each conveyor 32, 32a, 32b, 32c, 32d is set at a speed such that each set of molds 20, 20a, 20b, 20c, 20d is moved through heating chamber 34 in a time which substantially equals the needed curing time for the particular part contained therein.

Of course, it is understood that the above are merely preferred embodiments of the invention, and that various other embodiments as well as many changes and alterations may be made without departing from the spirit and broader aspects of the invention as defined in the claims.

The embodiments of the invention in which an exclusive property or privilege is claimed are defined as follows:

1. A method for manufacturing articles in batches from liquid silicone rubber, comprising:
   forming a plurality of identical, reusable first molds, each shaped to form a first one of the articles;
   forming a plurality of identical, reusable second molds, each shaped to form a second one of the articles;
   providing an elongated oven having a substantially constant, preselected temperature which is sufficiently high to cure each of the first and second articles over a specified period of time;
   providing first and second continuously feeding conveyors positioned to transport the first and second molds through the oven, and including means for independently controlling the speed of each of the first and second conveyors in accordance with the particular article being conveyed through the oven;
   positioning a filling station adjacent an upstream end of the conveyors;
   positioning an unloading station adjacent a downstream end of the conveyors;
   placing the first and second molds at the filling station;
   manually filling a preselected number of the first and second molds with liquid silicone rubber;
   adjusting the speed of the first conveyor in accordance with the particular characteristics of the first articles such that the time that each of the first articles takes to travel through the oven on the first conveyor is substantially equal to the time necessary to cure each of the first articles at the preselected oven temperature;
   adjusting the speed of the second conveyor in accordance with the particular characteristics of the second articles, such that the time that each of the second articles takes to travel through the oven on the second conveyor is substantially equal to the time necessary to cure each of the second articles at the preselected oven temperature;

sequentially connecting the filled first molds with the first conveyor adjacent the upstream end thereof, and thereby transporting the same through the oven, and heating the liquid silicone rubber in each of the first molds to fully cure the first articles;

sequentially connecting the filled second molds with the second conveyor adjacent the upstream end thereof, and thereby transporting the same through the oven, and heating the liquid silicone rubber in each of the second molds to fully cure the second articles;

sequentially disconnecting the filled first and second molds from the first and second conveyors adjacent the downstream end thereof;

positioning the first and second molds disconnected from the first and second conveyors on the unloading station;

cooling the first and second molds in the unloading station to a temperature which will permit mutual handling of the same;

releasing the cured first and second articles from the first and second molds; and returning the emptied first and second molds to the filling station, whereby a variety of different types and shapes of articles can be efficiently manufactured in batches at reduced cost.

2. A method as set forth in claim 1, wherein:
said mold filling step is completed with respect to each of the preselected first and second molds before any one of the preselected first and second molds is connected with the conveyor during said mold connecting step.

3. A method as set forth in claim 2, wherein:
said mold disconnecting step is completed with respect to each of the preselected first and second molds before any one of the preselected first and second articles is released during said article releasing step.

4. A method as set forth in claim 3, wherein:
said mold cooling step is completed with respect to each of the preselected first and second molds before any one of the preselected first and second articles is released during said article releasing step.

5. A method as set forth in claim 4, wherein:
said mold returning step includes sequentially connecting the emptied first and second molds to return sides of the conveyors, and sequentially disconnecting the same at the filling station.

6. A method as set forth in claim 5, wherein:
said mold disconnecting step is completed with respect to each of the preselected first and second molds before any one of the preselected first and second articles is released during said article releasing step.

7. A method as set forth in claim 1, wherein:
said mold cooling step is completed with respect to each of the preselected first and second molds before any one of the preselected first and second articles is released during said article releasing step.

8. A method as set forth in claim 1, wherein:
said mold returning step includes sequentially connecting the emptied first and second molds to return sides of the conveyors, and sequentially disconnecting the same at the filling station.

* * * * *